United States Patent [19]

Fu-Chao

[11] Patent Number: 4,767,130

[45] Date of Patent: Aug. 30, 1988

[54] FOLDABLE PEDICAB

[76] Inventor: Wang Fu-Chao, 3rd Fl., No. 31, Chao Chou St., Taipei, Taiwan

[21] Appl. No.: 112,818

[22] Filed: Oct. 23, 1987

[51] Int. Cl.[4] .......................... A61G 5/00; B62K 17/00

[52] U.S. Cl. ...................................... 280/202; 280/42; 280/242 WC; 280/278; 280/287; 280/282; 403/108; 403/362; 403/377

[58] Field of Search ............... 280/202, 278, 287, 282, 280/42, 650, 242 WC, 648; 403/108, 362, 377

[56] References Cited

U.S. PATENT DOCUMENTS

| | | | |
|---|---|---|---|
| 1,059,466 | 4/1913 | Hosmer | 280/202 |
| 4,026,568 | 5/1977 | Hallam | 280/650 X |
| 4,101,143 | 7/1978 | Sieber | 280/650 X |
| 4,693,490 | 9/1987 | Loodberg et al. | 280/242 WC X |

FOREIGN PATENT DOCUMENTS

| | | | |
|---|---|---|---|
| 2101540 | 1/1983 | United Kingdom | 280/242 WC |

*Primary Examiner*—John J. Love
*Assistant Examiner*—Mitchell J. Hill
*Attorney, Agent, or Firm*—Ladas & Parry

[57] ABSTRACT

A foldable pedicab has a foldable assembly which includes a main frame, two back frames mounted rotatably on the main frame, two seat frames mounted rotatably on the back frames respectively, two armrest members mounted rotatably on the back frames respectively, and two footrests mounted rotatably on the main frame. The seat frames are locked releasably on the main frame. The armrest frames are locked releasably on the seat frames. A swing wheel is mounted removably on leading end of the foldable assembly. Two main wheels are mounted removably on opposite sides of the foldable assembly. If necessary, a driving wheel assembly may be mounted removably on tail end of the foldable assembly so that the pedicab can be drived by a person riding on the driving wheel assembly. In absence of the driving wheel, the pedicab can form a hand-pushable wheelchair. When the driving wheel assembly, main wheels, and swing wheel are removed from the foldable assembly, the foldable assembly can be folded into a compact portable unit. The driving wheel assembly, swing wheel, and main wheels are then attached to the foldable assembly thereby forming a pushable small unit.

14 Claims, 16 Drawing Sheets

FOLDABLE PEDICAB

BACKGROUND OF THE INVENTION

The present invention realtes to a pedicab, and more particularly, one which can be folded into a compact portable unit.

A common type of pedicab is a hand-pushable wheelchair for carrying one or two patients. The present invention is directed to the wheelchair for two patients. Because a conventional wheelchair can not be folded, it is inconvenient to carry the wheelchair by the means of transportation such as by car, bus, or train, when going on an extended journey. Recently, a more advanced wheelchair equipped with a driving wheel assembly has been developed for longer journeys. The driving wheel assembly is connected to the tail end of the wheelchair so that the wheelchair can be easily driven by a normal person riding on the driving wheel assembly. The advanced wheelchair may be of course used in other applications, but the driving wheel-activated wheelchair can not be folded. Thus, this wheelchair will require to take up more space. When it is desired to go on a longer journey, it is inconvenient to transport the bulky wheelchair in vehicles.

SUMMARY OF THE INVENTION

It is therefore an object of the present invention to provide a pedicab foldable into a compact portable unit which is equipped with wheels at the opposite sides, thereby enabling the portable unit to be conveniently pushed along the ground.

It is another object of the present invention to provide a foldable pedicab equipped with a driving wheel assembly which is connected removably to the tail end of the pedicab for driving the pedicab.

According to the present invention, the foldable pedicab includes a foldable assembly with a main frame, two removable main wheels mounted rotatably on the opposite sides of the foldable assembly, and a removable swing wheel mounted rotatably on a leading end portion of the foldable assembly. Disposed on the opposite sides of the main frame are two foldable back frames, two foldable seat frames, two foldable armrest members, two seat frame lock mechanisms, two armrest member lock mechanisms, two footrests, and two wheel shafts. The main wheels are mounted rotatably on the wheel shafts by two quick-release lock mechanisms.

Each of the back frames is connected hingedly to and above a tail end portion of the main frame. Each of the seat frames is connected hingedly to a lower end portion of the corresponding back frame. Each of the armrest members is connected rotatably to an outer side of the corresponding back frame. The seat frame lock mechanisms are used to lock releasably the seat frames on the main frame. The armrest lock mechanisms are used to lock releasably the armrest members on the seat frames. Each of the footrests is connected hingedly to a leading end portion of the main frame. In the preferred embodiment, the wheel shafts are respectively secured to the outer side of one of the back frames.

The method for folding the pedicab of the present invention includes the steps of (1) removing the swing wheel and main wheels from the foldable assembly; (2) releasing the armrest member lock mechanisms and subsequently turning the armrest members rearwardly to overlap the rear sides of the back frames; (3) releasing the seat frame lock mechanisms and subsequently turning the seat frames upwardly to overlap the front sides of the back frames; (4) rotating the back frames to overlap each other; (5) rotating the footrests to a vertical position permitting the foldable assembly to form together a compact portable unit; (6) attaching the swing wheel to the portable unit; and (7) attaching the main wheels rotatably to the opposite sides of the portable unit which can be thus conveniently pushed along the ground by hand.

Preferably, also provided is a driving wheel assembly connected romovably to a tail end of the foldable assembly. The driving wheel assembly includes a removable saddle member, and a brake cable assembly for controlling a driving wheel. When the pedicab is folded, the brake cable assembly is first adjusted to entirely attach onto the foldable assembly. Then, the driving wheel is removed from the pedicab and the saddle member is removed from the driving wheel assembly. After the foldable assembly has been folded into a compact portable unit, the removed driving wheel and saddle member can be attached to the portable unit.

Accordingly, the pedicab of the present invention may be converted into the following forms:

(1) a standard hand-pushable wheelchair;

(2) a driving wheel activated wheelchair which is suitable for a somewhat long journey; and (3) a compact portable unit which can be conveniently transported in vehicles when going on an extended journey.

BRIEF DESCRIPTION OF THE DRAWINGS

Other features and advantages of the present invention will become apparent from the following detailed description of a preferred embodiment of the present invention with reference to the accompanying drawings in which.

DETAILED DESCRIPTION OF THE PREFERRED EMBODIMENT

Figure 2:
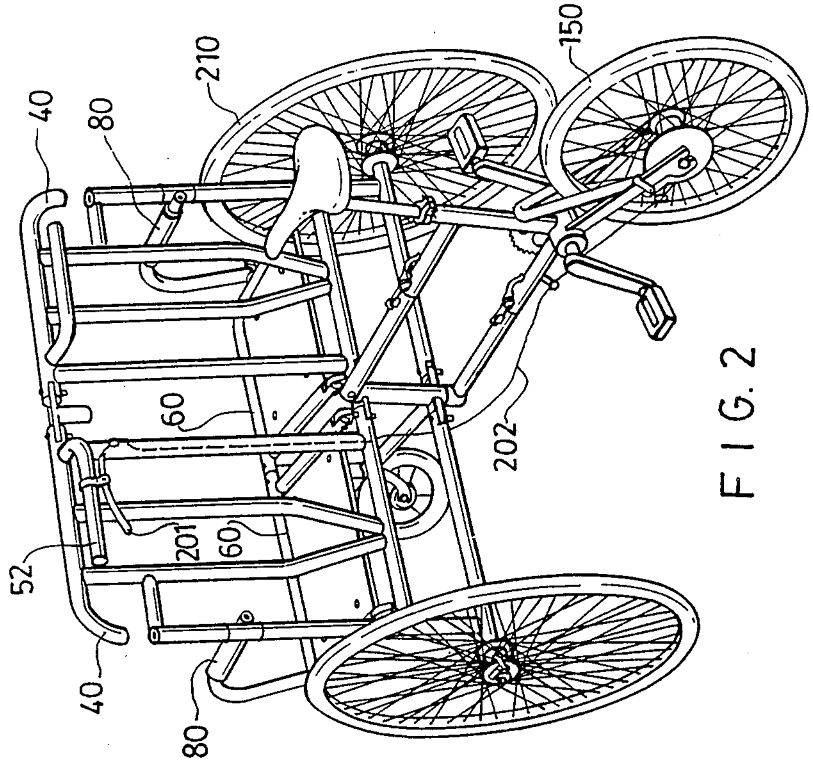
FIGS. 1 and 2 are perspective views showing a foldable four-wheel vehicle constructed of a foldable pedicab and a driving rear wheel assembly according to the present invention.
Figure 1:
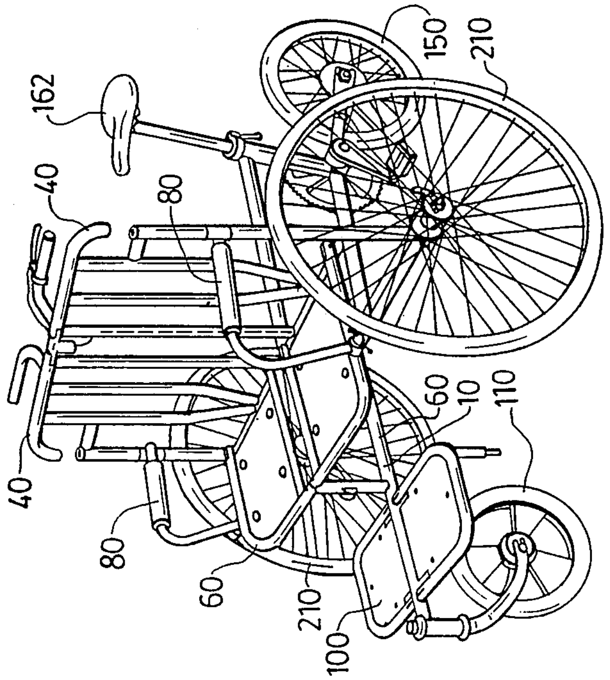

Referring to FIGS. 1 and 2, there is shown a foldable four-wheel vehicle according to the present invention. The four-wheel vehicle includes a foldable pedicab, and a driving wheel assembly connected removably to the tail end of the pedicab. The foldable pedicab has a foldable assembly which includes a main frame 10, two back frames 40 mounted on a tail end portion of the main frame 10, two seat frames 60 each mounted on a lower end of one back frame 40, two armrest members 80 each mounted on an outer side of one back frame 40, and two footrests 100 mounted on a leading end of the main frame 10. A swing wheel 110 is mounted removably on the leading end of the foldable assembly. Two main wheels 210 are mounted removably on the opposite sides of the foldable assembly. The driving wheel assembly 150 has a removable saddle member 162. Fixed on the upper end of the back frames 40 are two handlebars 52, one of which is provided with a brake level 201 connected to a brake cable 202 for the driving wheel assembly 150.

Figure 3:
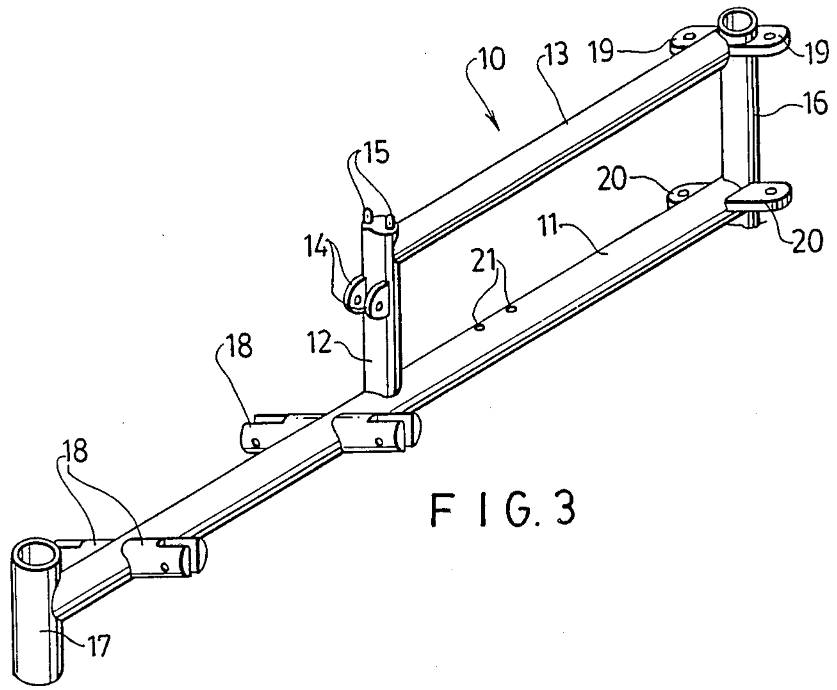
FIG. 3 is a perspective view showing a main frame of the foldable pedicab.

Referring to FIG. 3, the main frame 10 includes a keel beam 11, an upright tube 12 extending upwardly from the middle of the keel beam 11, a steering outer column 16 extending upwardly from the tail end of the keel beam 11, an upper beam 13 interconnecting the upper ends of the upright tube 12 and the steering outer column 16, and a vertical outer sleeve 17 secured to the leading end of the keel beam 11. Projecting transversely from the front portion of the keel beam 11 are two pairs of opposed footrest hinge fittings 18. Projecting transversely from the steering outer column 16 are a pair of upper back frame hinge fitting 19, and a pair of lower back frame hinge fitting 20. The upright tube 12 includes a pair of lugs 14, each having a hole, and a pair of bumps 15. In addition, the keel beam 11 is formed with two vertical lock holes 21.

Figure 5:
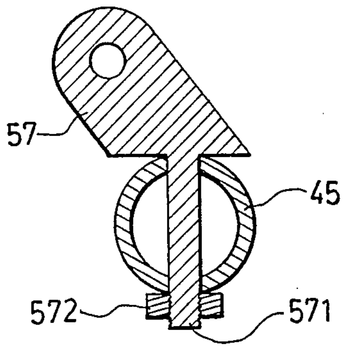
FIG. 5 is a schematic view illustrating how a seat frame hinge fitting is fixed on the back frame.
Figure 4:
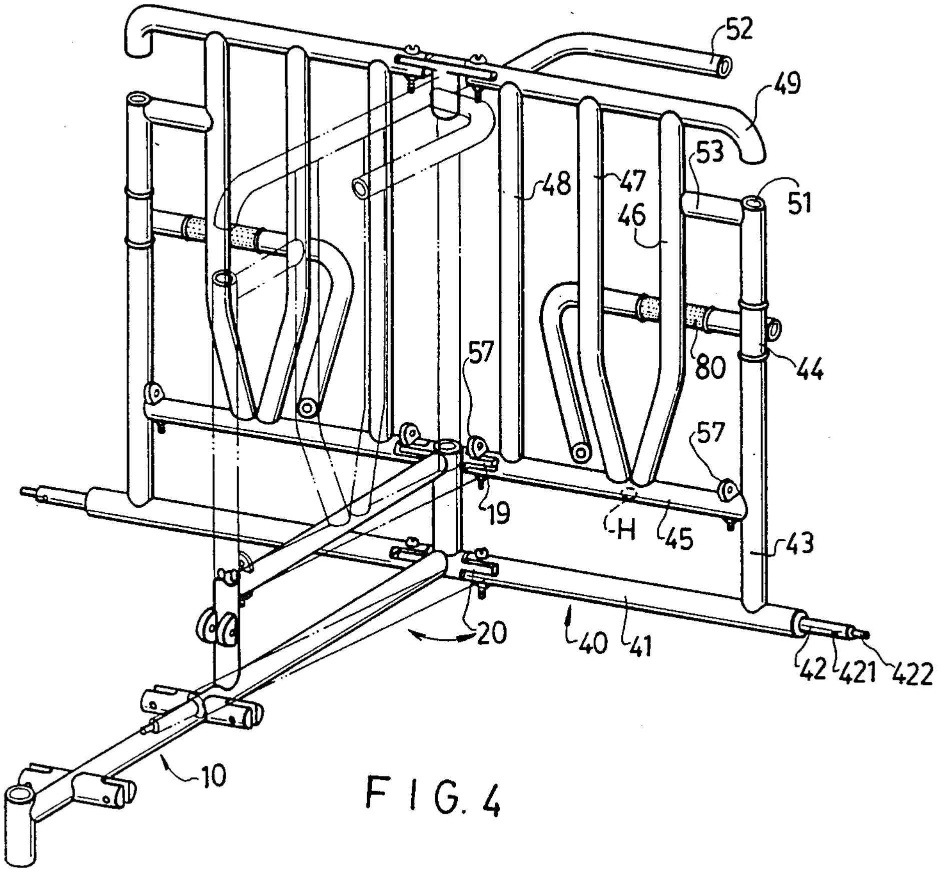
FIG. 4 is a perspective view showing two foldable back frames of the foldable pedicab, in which the folded position of one of the back frames is shown in the phantom lines.

Referring to FIG. 4, each of the back frames 40 includes a lower tube 41 connected hingedly to the lower back frame hinge fitting 20. A diameter-reduced wheel shaft 42, which includes a through hole 421 and a end tongue 422, is secured to the outer end of each lower tube 41. Extending upwardly from each lower tube 41 is an arm tube 43 which has a diameter-reduced portion. Each armrest 80 is a generally L-shaped tube having an upper vertical sleeve 44 which is sleeved rotatably on the diameter-reduced portion of the arm tube 43. Projecting transversely inwardly from each arm tube 43 is a middle tube 45 connected hingedly to the upper back frame hinge fitting 19 of the steering outer column 16. The bottom wall of the middle tube 45 is formed with a cable store hole H. The upper end surface of the arm tube 43 is formed with a wheel store hole 51. Connecting securely to the arm tubes 43 and to the middle tubes 45 by connecting rods 53, 46, 47, and 48 are two hingedly interconnected upper tubes 49 to which the handlebars 52 are attached. As illustrated, the rotating axes of the lower tube 41, the middle tube 45, and the upper tube 49 on the same side are in line with one another. With particular reference to FIG. 5, four aligned seat frame hinge fittings 57 each having a threaded extension arm 571 are secured to the middle tubes 45 by a lock nut 572.

Figure 6:
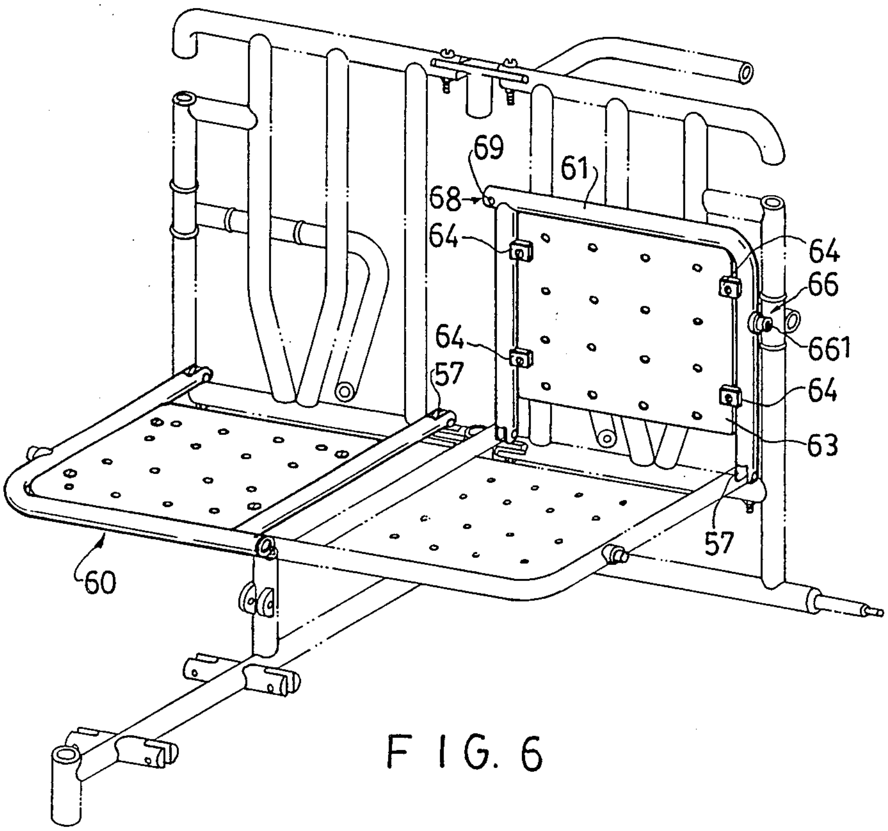
FIG. 6 is a perspective view showing two foldable seat frames of the foldable pedicab, one of which is folded.

Referring to FIG. 6, each of the seat frames 60 includes a U-shaped tube 61 with four lugs 64, and a seat pane 63 connected securely to the lugs 64 by bolts and nuts. The U-shaped tube 61 has two ends connected hingedly to the seat frame hinge fittings 57 of the back frame 40. Projecting from the U-shaped tube 61 are an armrest member fitting 66 extending away from the main frame 10 and having a threaded hole 661, and a transverse extension tube 68 extending toward the main frame 10 and having a positioning hole 69. When the transverse extension tube 68 abuts against the upper end of the upright tube 12, the bump 15 of the upright tube 12 will engage with the positioning hole 69 of the transverse extension tube 68.

Figure 7:
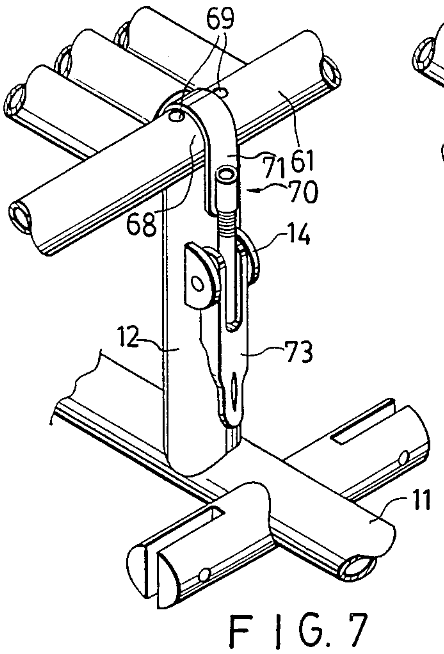
FIGS. 7 and 8 are schematic views illustrating how the seat frame is locked on the main frame.
Figure 8:
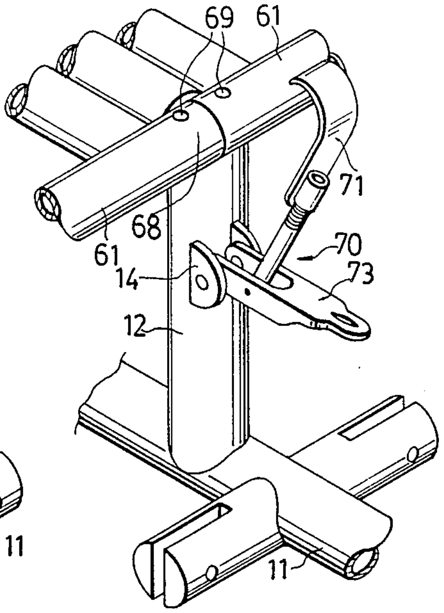

Referring to FIG. 7, to lock the seat frames 60 on the main frame 10, the upright tube 12 is provided with a seat frame lock mechanism 70 which includes a hook bar 73 mounted hingedly on the lugs 14 of the upright tube 12, and a hook 71 mounted hingedly on the hook bar 73 for holding both of the transverse extension tubes 68 of the seat frames 60 thereon. Referring to FIG. 8, when the pedicab is folded, the hook bar 73 can be turned upwardly. The hook 71 is then released from the transverse extension tubes 68 permitting the latter to be turned upwardly.

Figure 10:
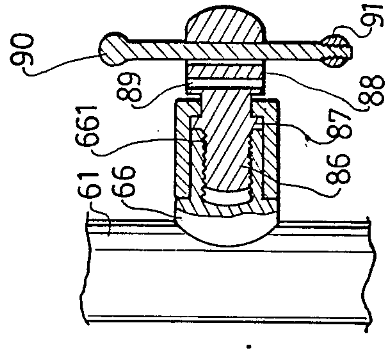
FIGS. 9 to 11 are schematic views illustrating how a foldable armrest member is locked on the seat frame.
Figure 9:
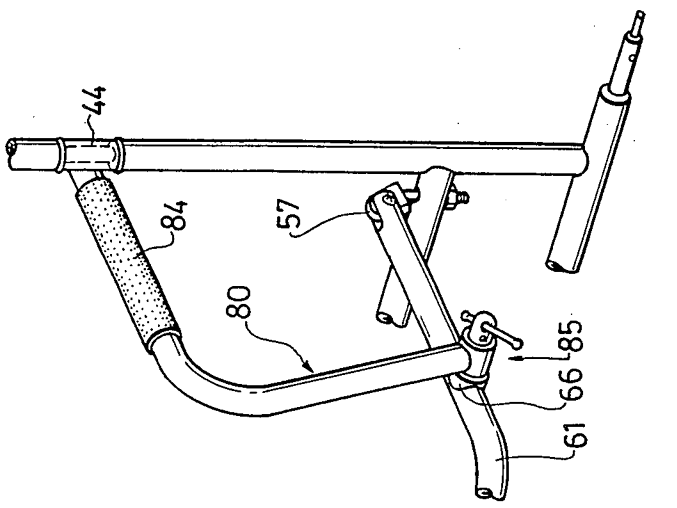
Figure 11:
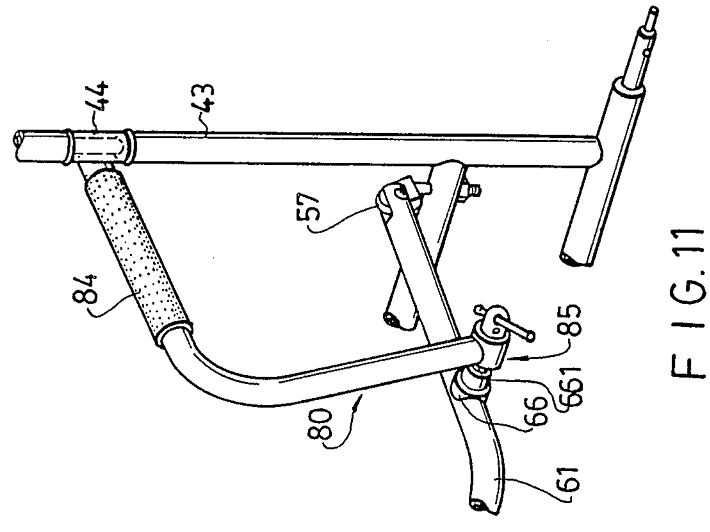

Referring to FIGS. 9 to 11, the armrest member 80 includes an annular pad 84 sleeved thereon in a known manner. The lower end of the armrest member 80 is provided with a transverse sleeve 85 on which is provided an adjusting bolt 86. An outward flange 87 is formed on the adjusting bolt 86 within the transverse sleeve 85. After the adjusting bolt 86 is inserted through the transverse sleeve 85, a diameter-increased head 88 is connected securely to the adjusting bolt 87 by a lock-pin 89. Then, a rotary level 90 having an enlarged end is inserted through the adjusting bolt 87 and subsequently engaged threadably with an internally threaded ball 91 at the opposite end. When the pedicab is folded, by actuating the rotary level 90, the transverse sleeve 85 can be removed from the armrest member fitting 66. Because of the engagement of the fitting 66 within the sleeve 85 and of the engagement of the adjusting bolt 86 within the fitting 66, the armrest member 80 can be locked stably on the seat member 60.

Figure 12:
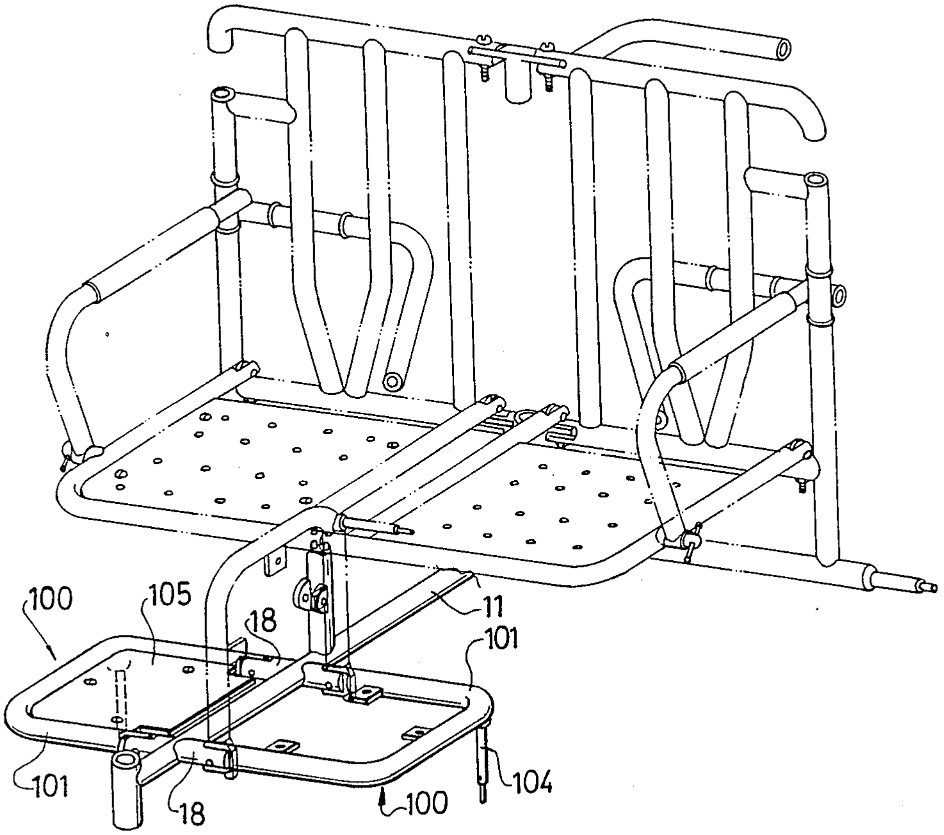
FIG. 12 is a perspective view showing two foldable footrests of the foldable pedicab.
Figure 15:
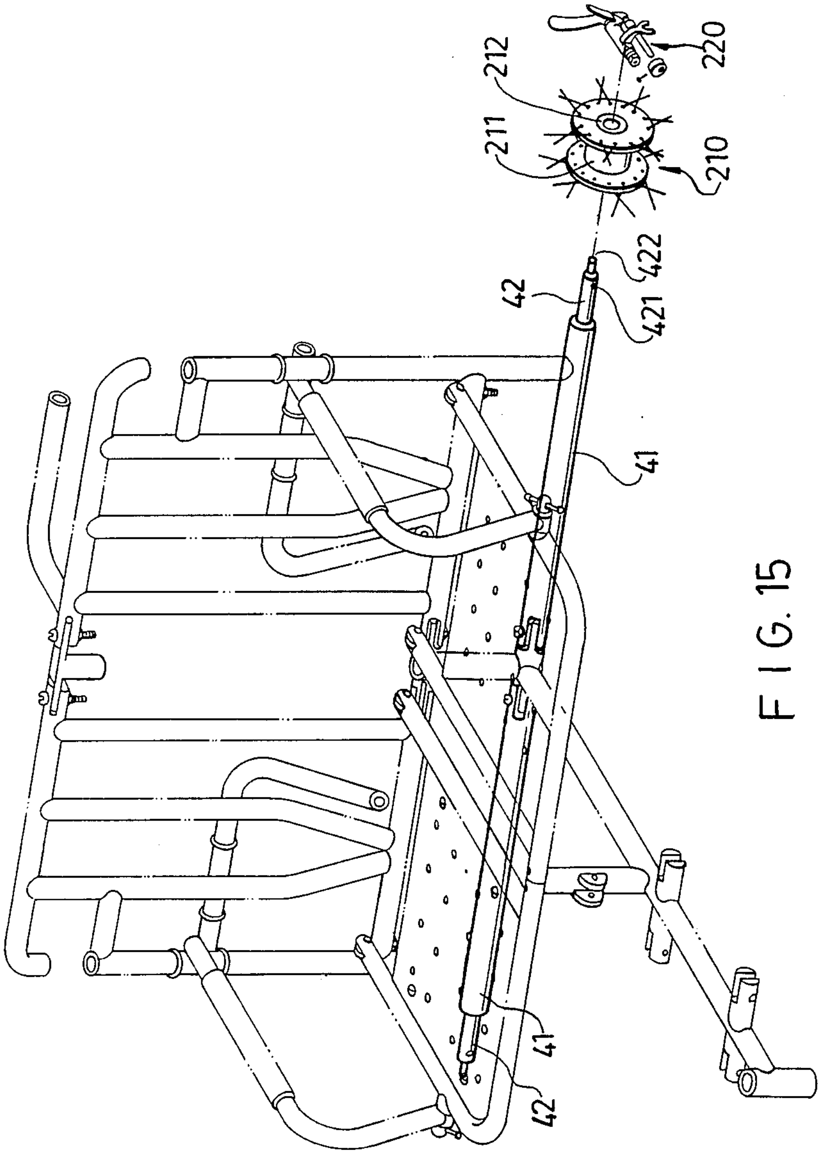
FIG. 15 is an exploded perspective view showing two wheel shafts, a main hub, and a quick-release lock mechanism for locking the main hub on the wheel shaft while permitting the main hub to rotate relative to the wheel shaft.

Referring to FIG. 12, each of the footrests 100 includes a U-shaped tube 101 and a foot pane 105 in a manner the same of that of forming the back frame 60. In this figure the left foot pane 105 is removed for convenience of illustration. Both ends of the U-shaped tube 101 are connected hingedly to the footrest hinge fittings 18. Projecting downwardly from the footrest 100 is a circuit rod 104 which is shaped in the form of the wheel shaft 42. When the pedicab is folded, the footrest 100 is turned upwardly to the position shown in the phantom lines permitting the circuit rod 104 to extend transversely outwardly for mounting one of the main wheel 210 thereon.

Figure 13:
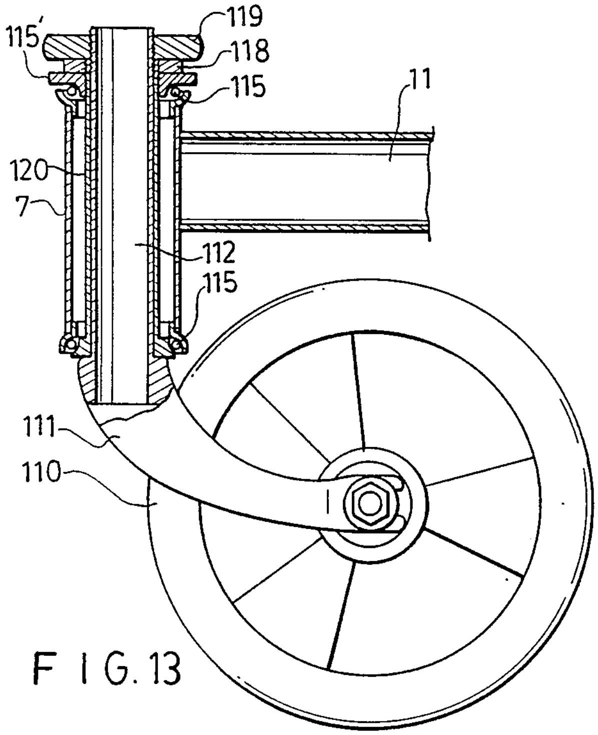
FIG. 13 is a schematic view illustrating how a removable swing wheel is mounted rotatably on the main frame of the foldable pedicab.
Figure 14:
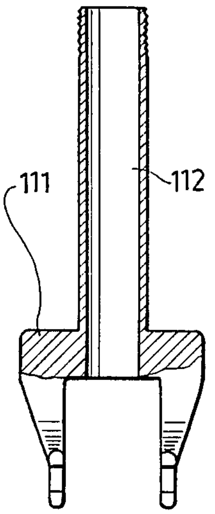
FIG. 14 is a schematic view how a swing fork is secured to a rotating shaft of the swing wheel.

Referring to FIG. 13, the swing wheel 110 is mounted rotatably on a swing fork 111 (see FIG. 14) which is secured to a rotating shaft 112. A vertical inner sleeve 120 is journalled within and on the vertical outer sleeve 17 by two ball bearings 115 and a jam nut 118. Each of the ball bearings 115 includes a bearing nut 115'. The rotating shaft 112 is inserted through the inner sleeve 120 and subsequently locked on the latter by a jam nut 118.

Figure 18:
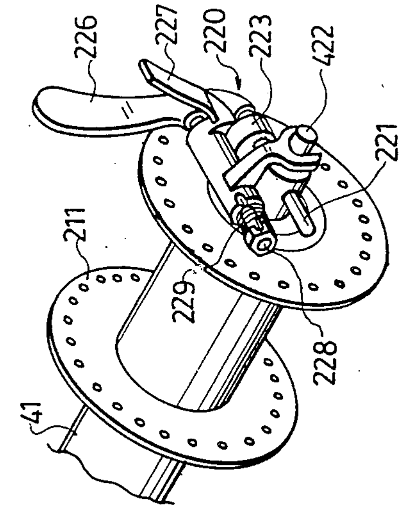
FIG. 18 is an assembled perspective view showing the main hub, the wheel shaft, and the quick-release lock mechanism.
Figure 19:
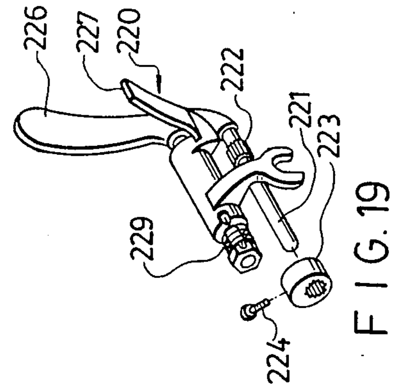
FIG. 19 is an exploded perspective view showing the quick-release lock mechanism.

Referring to FIGS. 15 to 19, the main wheel 210 has a main hub 211 in which two hub bearings 212 are mounted. The main wheel 210 is retained on the wheel shaft 42 by a quick-release lock mechanism 220 which includes a cam rod 221 inserted into the through hole 421 of the wheel shaft 42. Referring to FIG. 18, the cam rod 221 has an enlarged portion 222 which is externally splined for engaging with an internally splined cam roller 223. The cam roller 223 further includes a threaded hole (not shown) through which a lock screw 224 engages threadably.

Figure 16:
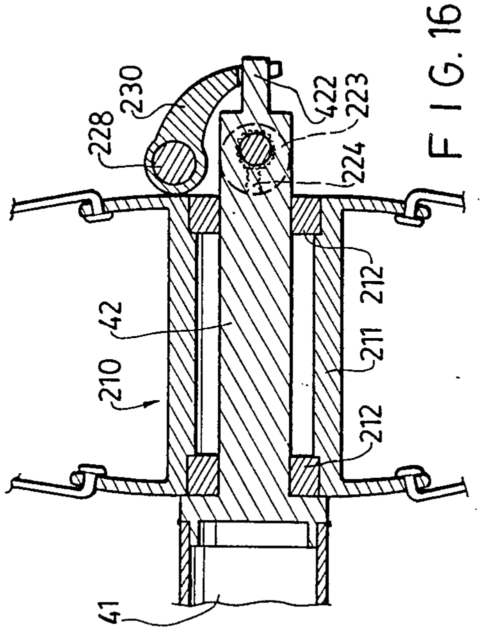
FIGS. 16 and 17 are schematic views illustrating how the main hub is locked on the wheel shaft by the quick-release lock mechanism.
Figure 17:
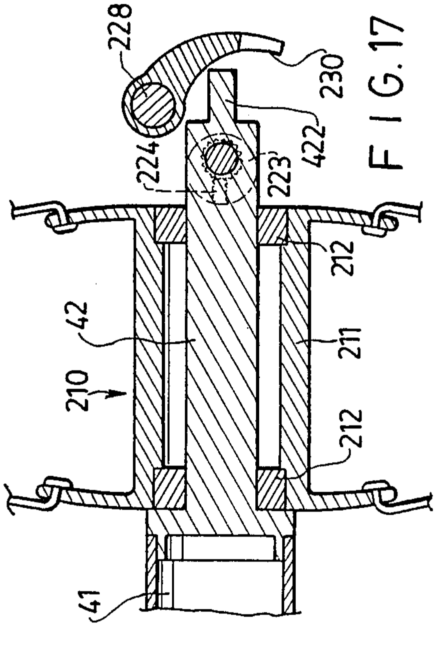
Figure 20:
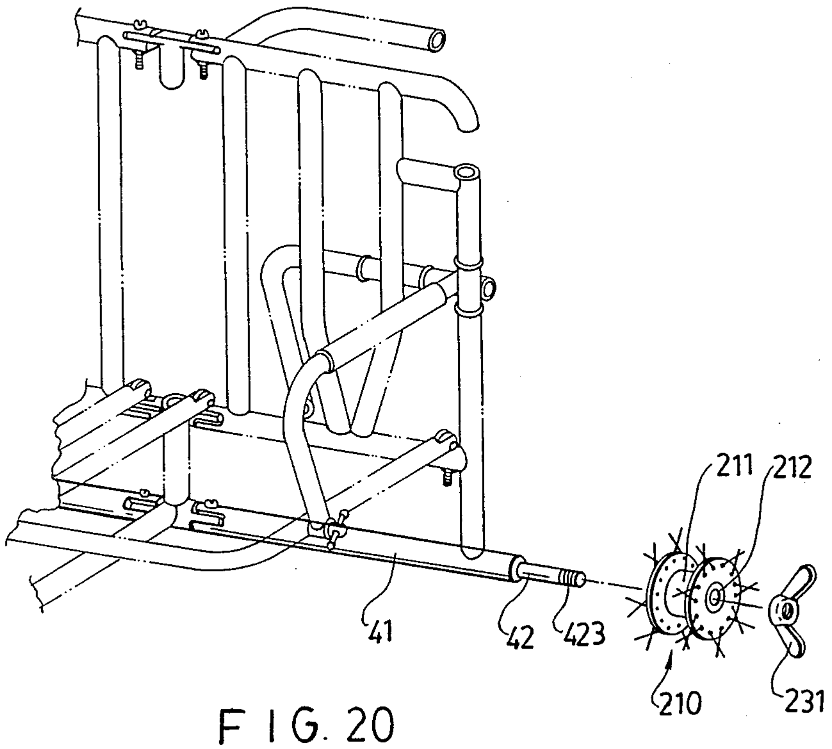
FIG. 20 is an exploded perspective view showing the wheel shafts, the main hub, and a butterfly nut for locking the main hub on the wheel shaft while permitting the main hub to rotate relative to the wheel shaft.

Formed integrally with the tail end of the cam rod 221 is a curved lock bar 226 which is biased by a latch bar 227 formed on the tail end of a latch rod 228 to move toward the end surface of the main hub 211, thereby causing the cam roller 223 to move from the unlocking position, e.g. the position shown in FIG. 17, to the locking position shown in FIG. 16. A torsion spring 229 is provided for biasing the latch bar 227 to press against the lock bar 226. A two-pronged stopper 230 is provided on the quick-release lock mechanism 220 for holding the end tongue 422 of the wheel shaft 42 thereon. With the two-pronged stopper 230 held on the end tongue 422 of the wheel shaft 42, the cam rod 221 can not disengage from the through hole 421 of the wheel shaft 42.

Referring to FIGS. 16 and 17, in assembly, the cam rod 221 is inserted into the through hole 421 of the wheel shaft 42 in the condition shown in FIG. 17. Because of the bias force of the torsion spring 229, the latch rod 228 will move to abut against the end surface of the hub 211 while permitting the stopper 230 to hold the end tongue 422 thereon, as shown in FIG. 16. Similarly, when the pedicab is folded, the latch rod 228 is rotated to the position shown in FIG. 17 so that the cam rod 221 can be removed easily from the end tongue 422. Because the bias force of the torsion spring 229 is very small, it is easy to lock and release the quick-release lock mechanism 220.

Alternatively, the wheel shaft 42 may be provided with an externally threaded portion 423 at its outer end. To co-operate with the wheel shaft 42, there is also provided a butterfly nut 231 for engaging threadably with the externally threaded portion 423, so as to lock the wheel shaft 42 on hub bearings 212.

Figure 21:
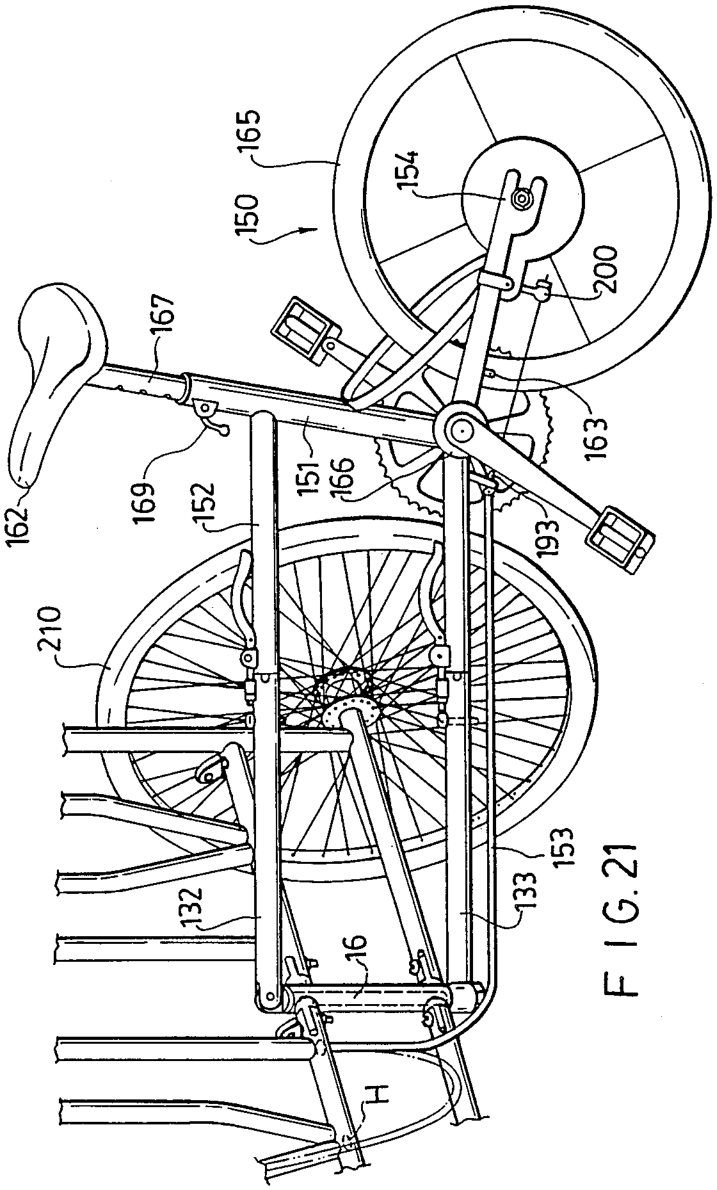
FIG. 21 is a shematic view illustrating how the driving wheel assembly is connected to the foldable pedicab by a double lock mechanism.

Referring to FIG. 21, the driving wheel assembly 150 includes a driving wheel 165 which is mounted rotatably on a drag fork 154 formed with a store pin 163. Secured to the drag fork 154 is a rear hub 166 on which a pair of illustated pedals are mounted. Secured to the rear hub 166 are a seat tube 151 and a first horizontal lower tube 153. Extending forwardly from the seat tube 151 is a first horizontal upper tube 152 which is parallel to the first horizontal lower tube 153. The saddle member 162 is supported on the seat tube 151. As illustrated, a chain wheel and a chain are connected between the pedals and the driving wheel 165 in a known manner for driving the driving wheel 165.

Figure 24:
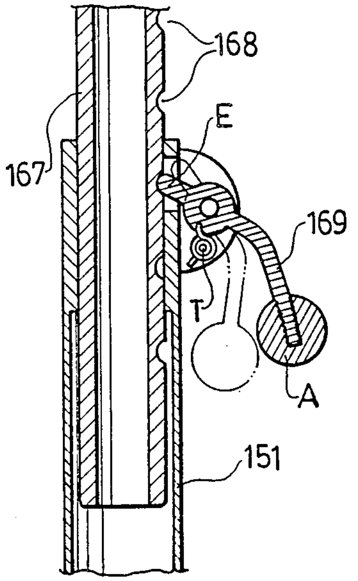
FIGS. 22 to 24 are schematic views illustrating a removable saddle member which is locked on the driving wheel assembly.
Figure 22:
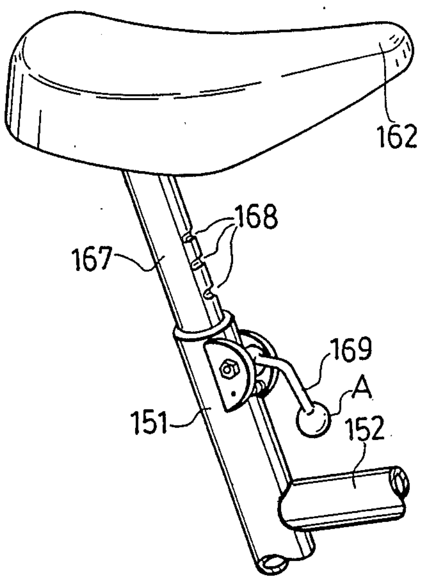
Figure 23:
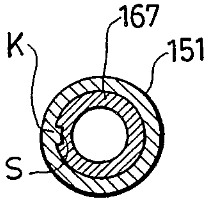

With particular reference to FIGS. 22 to 24, extending downwardly from the saddle member 162 is a supporting rod 167 which has an axially extending keyway S. The seat tube 151 includes an elongated key strip K engaged with the keyway S of the supporting rod 167 for preventing rotation of the supporting rod 167 relative to the seat tube 151. To lock the supporting rod 167 against axial movement relative to the seat tube 151, the outer surface of the supporting rod 167 is formed with a row of concavities 168 along the length thereof. The seat tube 151 is equipped with a rotatable seat lock bar 169 which is biased by a torsion spring T to cause the engagement end E of the seat lock bar 169 to move toward the supporting rod 167 and in turn to engage with one of the concavities 168. When it is desired to adjust the height of the saddle member 162, a knob A screwed to the seat lock bar 169 can be actuated to separate the engagement end E from the supporting rod 167.

Again referring to FIG. 21, the steering outer column 16 is provided with second horizontal upper and lower tubes 132, 133 which are parallel to each other and which are mounted pivotally on the opposite ends of the steering outer column 16.

Figure 25:
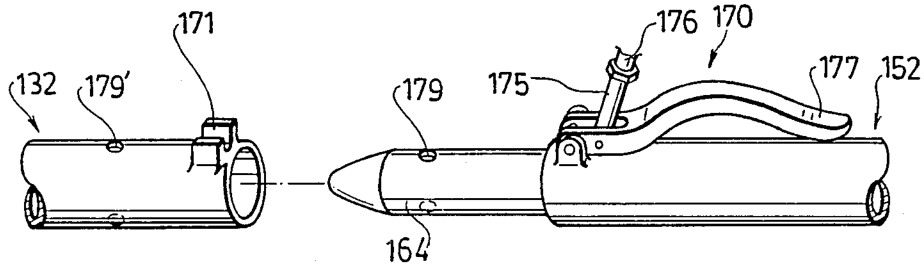
FIGS. 25 and 26 are schematic views illustrating the double lock mechanism provided for connecting the driving wheel assembly to the foldable pedicab.
Figure 26:
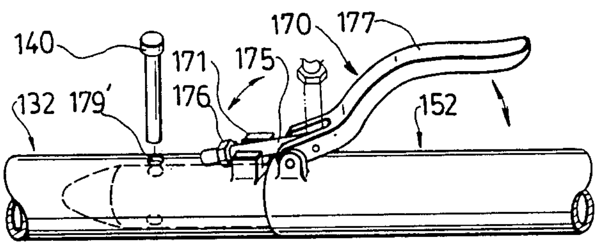

Referring to FIGS. 25 and 26, there is shown a double lock mechanism 170 for the first and second horizontal upper tubes 132, 152. The first horizontal upper tube 152 includes a tapered leading end 164 formed with a first vertical through hole 179, a tube body secured to the leading end 164, a driving wheel lock bar 177 mounted pivotally on the tube body, and a headed rod 175 mounted pivotally on the driving wheel lock bar 177 and having an enlarged free end 176. The second horizontal upper tube 132 includes a U-shaped block 171 fixed on its tail end for retaining the headed rod 175 thereon, and a second vertical through hole 179' in the second horizontal upper tube 132. A lock pin 140 is passed through both the first and second vertical through holes 179, 179'.

When the pedicab is folded, the driving wheel lock bar 177 is turned forwardly, as shown in FIG. 26, so that the headed rod 175 is subsequently turned rearwardly to separate from the U-shaped block 171. At the same time the lock pin 140 is moved out of the first and second vertical through holes 179, 179'.

Figure 27:
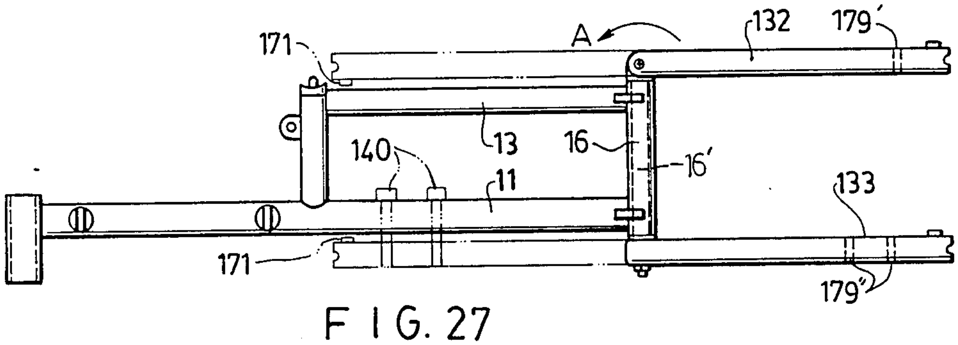
FIG. 27 is a schematic view illustrating how two horizontal connecting tubes mounted pivotally on a steering outer column of the foldable pedicab is folded.

Referring to FIG. 27, the second horizonal lower tube 133 is similar to the second horizontal upper tube 132 in construction except that an additional vertical through hole 179" is provided in the second horizontal lower tube 133. It should be mentioned that the first horizontal lower tube 153 is similar to the first horizontal upper tube 152 in construction. Certainly, it is understood in the art that a steering inner column 16' is connected securely to the first upper and lower horizontal tubes 152 and 153 of the driving wheel assembly 150 and mounted rotatably within the steering outer column 16. When the pedicab is folded, the second horizontal upper tube 132 is rotated about a horizontal axis in a direction of arrow A to abut against the upper beam 13 with the U-shaped block 171. While the second horizontal lower tube 133 is rotated about a longitudinal axis to abut against the keel beam 11 with the U-shaped block 171. The lock pins 140, which are just removed from the second horizontal upper and lower tubes 132, 133, are then inserted through the vertical through holes of the second horizontal lower tube 133 into the lock holes 21 of the keel beam 11.

Figure 28:
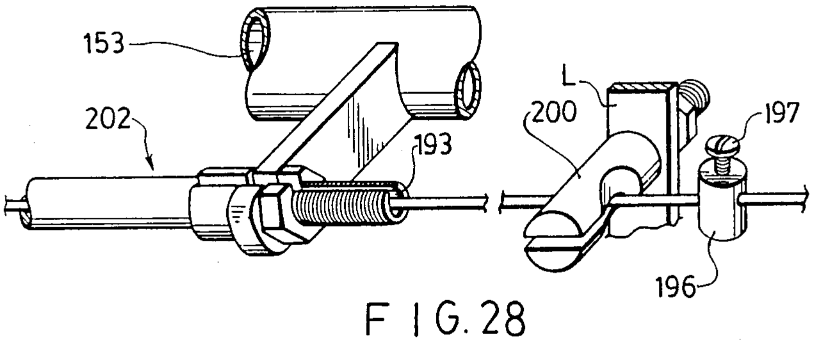
FIG. 28 is a schematic view illustrating how a brake cable is positioned on the foldable four-wheel vehicle.

Referring to FIG. 28, the brake cable 202, which has an upper portion (see FIG. 21) passed through the steering outer column 16, is guided by a slotted guide 193 secured to the first horizontal lower tube 153, and by a swivel jointer 200 mounted on a brake lining assembly L. A roller stop 196 is locked on the brake cable 202 by an adjusting screw 197. When the pedicab is folded, the tail portion of the brake cable 202 is removed from the driving wheel assembly 150 and subsequently inserted into the cable store hole H of the middle tube 45, as shown in FIG. 21, so as to permit the driving wheel assembly 150 to be removed from the the second upper and lower horizontal tubes 132 and 133.

Figure 29:
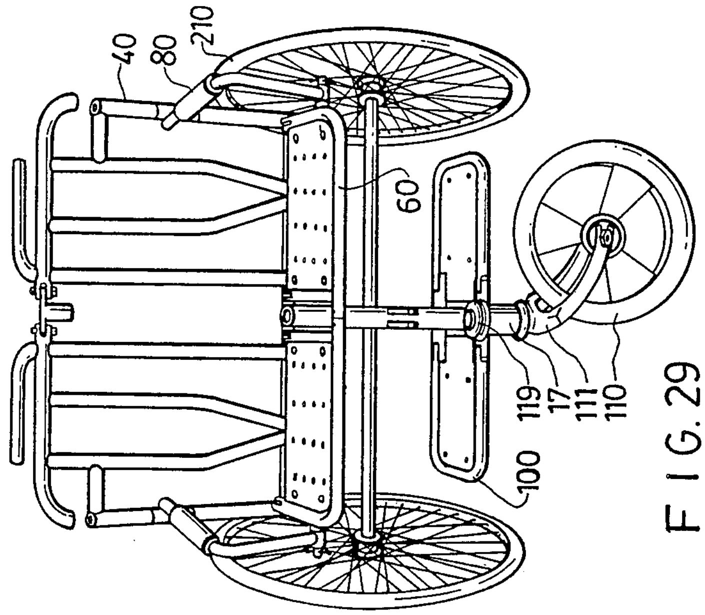
FIG. 29 is a perspecive view showing the foldable pedicab.

In this embodiment, when the pedicab is folded, the driving wheel assembly 150 is first separated from the second horizontal upper and lower tubes 132 and 133 to form a hand-pushable wheelchair shown in FIG. 29. Then, the swing wheel 110 and the main wheels 210 are removed from the foldable assembly.

Figure 30:
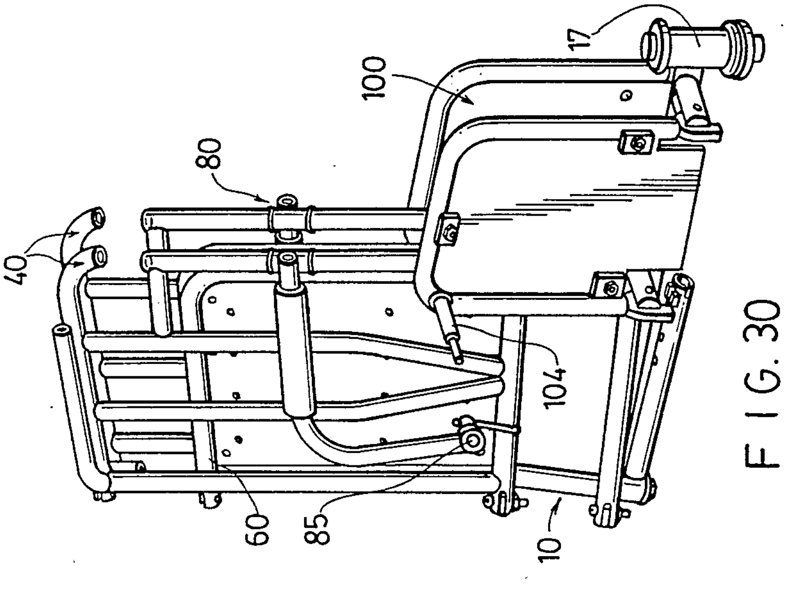
FIGS. 30 and 31 are schematic views illustrating a foldable assembly of the foldable pedicab when it is completely folded.
Figure 31:
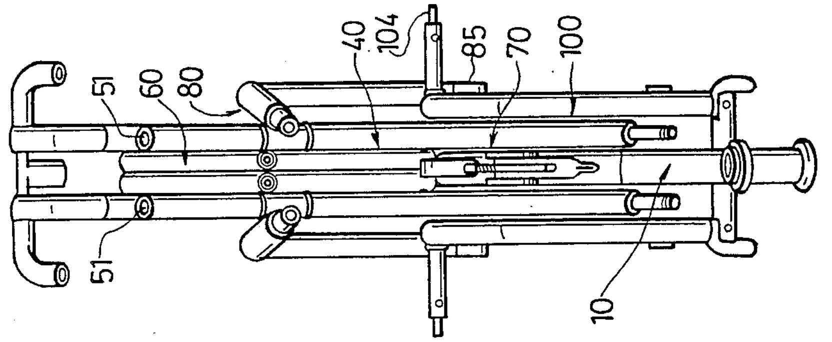

The foldable assembly may be folded into a compact portable unit shown in FIGS. 30 and 31 in the following sequence: (1) releasing the armrest members 80 from the seat frames 60 and subsequently turning the armrest members 80 rearwardly to overlap the rear sides of the back frames 60; (2) releasing the seat frames 60 from the main frame 10 and subsequently turning the seat frames 60 upwardly to overlap the front sides of the back frames 40; (3) turning the back frames 40 forwardly to overlap each other; and (4) rotating the footrests 100 to a vertical position.

Figure 32:
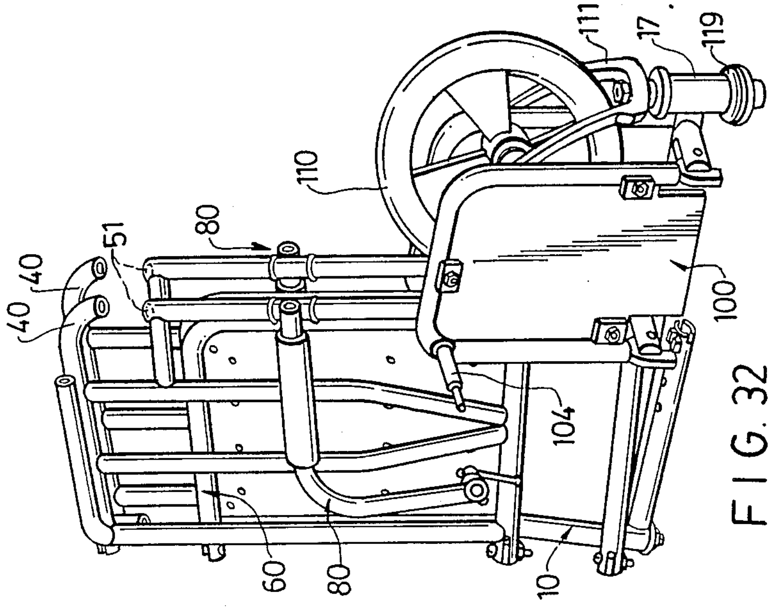
FIG. 32 is a perspective view showing the foldable assembly to which the swing wheel is attached when the foldable assembly is folded.

After the completion of folding the foldable assembly, the rotating shaft 112 of the swing wheel 110 is inserted into the upper opening of the vertical inner sleeve 120 and vertical outer sleeve 17 and subsequently locked thereon by the jam nut 118, as shown in FIG. 32. Finally, the saddle member 162 is removed from the driving wheel assembly 150 and then inserted between the upper tubes 49 of the back frames 40. The remaining part of the driving wheel assembly 150 is attached to the back frames 40 by inserting the store pin 163 into either of the wheel store holes 51, as shown in FIGS. 34 and 35.

Figure 33:
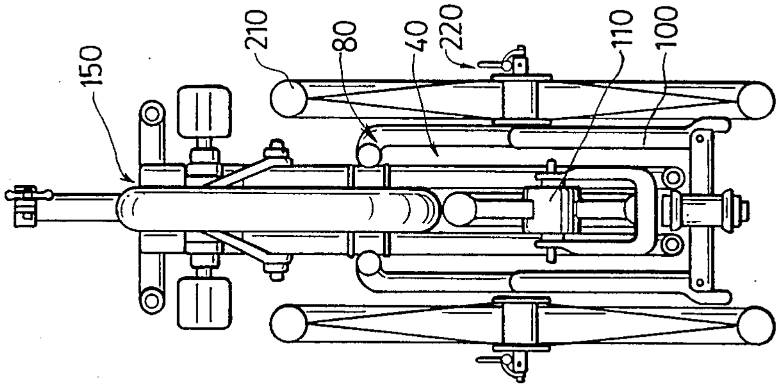
FIGS. 33 and 34 are perspective views showing the foldable four-wheel vehicle which is completely folded into a compact portable unit.
Figure 34:
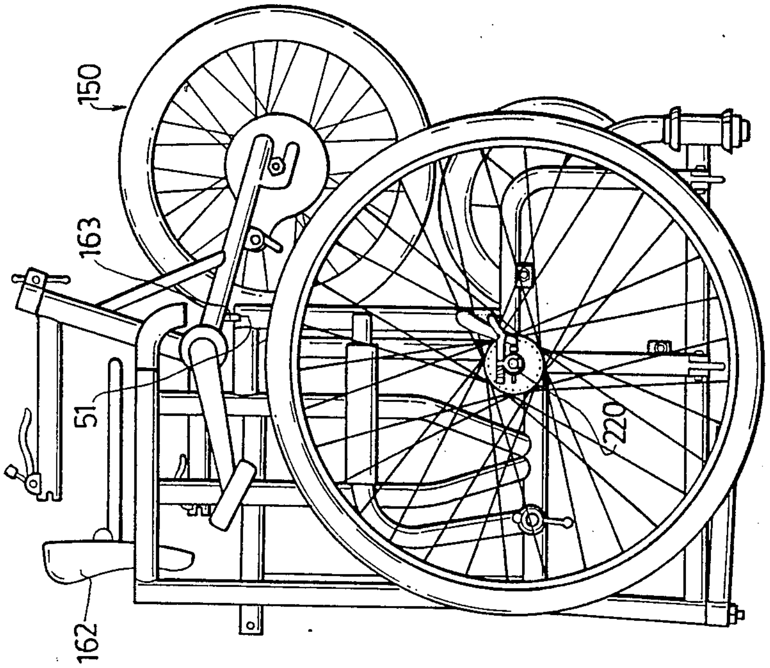

The completely folded unit of FIGS. 33 and 34 is sufficiently small to be conveniently transported in vehicles.

Although the foldable four-wheel vehicle of the present invention has many foldable and removable parts, as described hereinbefore, several single and double lock mechanisms are employed to ensure the safety of the assembled four-wheel vehicle according to the present invention in use.

If necessary, an additional brake system (not shown) may be provided for stopping the main wheels 210.

In addition, an esthetic umbrella (not shown) may be installed removably on the back frames 40 for preventing the passengers sitting on the seat frames 60 from sunlight or rain.

With the present invention thus explained, it is apparent that various modifications and variations can be made without departing from the scope and spirit of the present invention. It is therefore intended that the present invention be limited only as indicated in the appended claims.

I claim:

1. A foldable pedicab comprising:
a foldable assembly including:
  a main frame,
  two back frames, each connected hingedly to and above a tail end portion of said main frame, rotatable about a respective longitudinal axis to overlap each other so that they can be generally aligned with said main frame when said pedicab is folded,
  two seat frames each normally connected hingedly to a lower end portion of said corresponding back frame and rotatable about a horizontal axis to overlap a side of said corresponding back frame when said pedicab is folded,
  two armrest members each normally connected rotatably to an outer side of said corresponding back frame and rotatable about an axis to overlap opposite side of said corresponding back frame when said pedicab is folded,
  a seat frame lock mechanism locking releasably said seat frames on said main frame,
  two armrest member lock mechanisms respectively locking releasably said armrest members on said seat frames,
  two footrests each normally connected hingedly to a leading end portion of said main frame and rotatable about a horizontal axis to a generally vertical position when said pedicab is folded, and
  two wheel shafts fixed on opposite sides of said foldable assembly;
two quick-release lock mechanisms;
two main wheels respectively connected removably and rotatably to an outer end of said corresponding wheel shaft by said quick-release lock mechanisms;
a swing wheel connected removably to another leading end portion of said main frame;
means for attaching said swing wheel to said foldable assembly when said pedicab is folded; and
means for attaching said main wheels to said foldable assembly when said pedicab is folded;
whereby, said foldable assembly can be folded into a compact portable unit which is subsequently connected between said main wheels, so that at least part of said compact portable unit does not extend out of said main wheels, thereby forming a wheeled small unit which can be conveniently pushed along the ground by hand.

2. A foldable pedicab as claimed in claim 1, further comprising a driving wheel assembly connected removably to a tail end portion of said foldable assembly.

3. A foldable pedicab as claimed in claim 2, wherein said driving wheel assembly comprises:

a rear hub;

a pair of pedals mounted on said rear hub;

a drag fork secured to said rear hub;

a driving wheel mounted rotatably on said drag fork and drivable by said pedals;

a saddle member;

a generally vertical seat tube fixed on said rear hub and having a key strip extending lengthwise on an inner surface of said seat tube;

a supporting rod, secured to a bottom of said saddle member, movable within said seat tube, including an elongated keyway engaged with said key strip for preventing relative rotation between said supporting rod and said seat tube, and a plurality of equally spaced concavities provided lengthwise in said supporting rod;

a seat lock bar, mounted rotatably on said seat tube, having an engagement end selectively engaged with one of said concavities, and a release end drivable to separate said engagement end from said supporting rod; and a torsion spring for biasing said engagement end of said seat lock bar to move toward said supporting rod so that said engagement end can engage with one of said concavities, thereby preventing relative movement between said supporting rod and said seat tube;

whereby, height of said saddle member can be adjusted easily by engagement of said engagement end of said seat lock bar with selected one of said concavities of said supporting rod.

4. A foldable pedicab as claimed in claim 3, wherein said driving wheel assembly includes a brake cable assembly with a brake cable for braking said driving wheel, said brake cable has a leading portion mounted on said foldable assembly, and a tail portion mounted removably on said driving wheel assembly, and wherein said foldable assembly has a store tube having a store hole at an end thereof, whereby, when said pedicab is folded, said tail portion of said brake cable can be removed from said driving wheel assembly and subsequently inserted into said store tube through said store hole.

5. A foldable pedicab as claimed in claim 3, wherein at least one of said back frames has a groove, and wherein said drag fork includes a tongue well-matched with said groove for being inserted tightly into said groove of said back frame when said pedicab is folded.

6. A foldable pedicab as claimed in claim 2, wherein said driving wheel has two parallel first horizontal tubes at its leading end, and wherein said foldable assembly has two parallel second horizontal tubes mounted rotatably on its tail end for connecting removably with said first horizontal tubes respectively.

7. A foldable pedicab as claimed in claim 6, wherein each of said first horizontal tubes includes a tapered leading end inserted into a tail end of said corresponding second horizontal tube and having a first vertical through hole in said tapered leading end, a tube body secured to said tapered leading end, a driving wheel lock bar mounted pivotally on said tube body and having a free end abutting against said tube body, and a headed rod mounted pivotally on said driving wheel lock bar and having a free end with an enlarged portion thereon, and wherein each of said second horizontal tubes includes a U-shaped block fixed thereon for retaining said headed rod thereon, a second vertical through hole provided in said second horizontal tube opposite to said first vertical through hole, and a headed fastener inserted through said first and second vertical through holes; whereby, when said free end of said driving wheel lock bar is turned forwardly, said headed rod can be removed from said U-shaped block so that said first and second horizontal tubes can be separated from each other.

8. A foldable pedicab as claimed in claim 1, wherein said back frames are disposed on opposite sides of said main frame, and wherein said wheel shafts are disposed on opposite sides of said main frame, said back frame and said wheel shaft on same side of said main frame being rotatable relative to said main frame about same longitudinal axis.

9. A foldable pedicab as claimed in claim 1, wherein rotating axes of said back frames, seat frames, and armrest members are positioned on a same plane.

10. A foldable pedicab as claimed in claim 1, wherein said seat frame lock mechanism comprises:

each of said seat frames having a free end with a transverse tube fixed thereon; and said main frame including a seat frame lock bar mounted pivotally thereon below said corresponding transverse tube, and a hook mounted pivotally on said seat frame lock bar for holding both of said transverse tubes of said seat frames thereon, said seat frame lock bar having a free end abutting against said main frame;

whereby, when said free end of said seat frame lock bar is turned upwardly toward said tranverse tube, said hook can be separated from said transverse tube so that said seat frame can be folded.

11. A foldable pedicab as claimed in claim 1, wherein each of said armrest member lock mechanism comprises:

a cylindrical tongue projecting transversely outwardly from said seat frame and having a threaded hole in an end surface of said cylindrical tongue;

a transverse sleeve, secured to a lower end of said armrest member, sleeved on said cylindrical tongue, having a threaded through hole therein aligned with said threaded hole of said cylindrical tongue; and an adjusting bolt, mounted movably on said transverse sleeve, engaged removably in said threaded hole of said seat member, having a head which can be rotated conveniently.

12. A foldable pedicab as claimed in claim 1, wherein said means for attaching said swing wheel to said foldable assembly when said pedicab is folded includes:

said main frame including a vertical outer sleeve fixed thereon, and an inner sleeve journalled on and within said outer sleeve;

a swing fork connected rotatably to said swing wheel;

a rotating shaft, secured to an upper end of said swing fork, inserted upwardly through said inner sleeve, having a threaded upper end portion extending out of and immediately above said inner sleeve; and a lock nut engaged with said threaded upper end portion of said rotating shaft for connecting rigidly said rotating shaft to said inner sleeve;

whereby, when said pedicab is folded, by removing said lock nut from said rotating shaft, said rotating shaft carrying said swing fork and said swing wheel thereon can be removed from said inner sleeve; then, said rotating shaft will be inserted into an upper opening of said inner sleeve and subsequently locked on said inner sleeve by said lock nut.

13. A foldable pedicab as claimed in claim 1, wherein each of said wheel shafts is a cylindrical shaft having a through hole, wherein each of said main wheels includes a hub having two generally flat end surfaces, and a pair of bearings mounted within and on said hub for journalling said wheel shafts thereon, and wherein each of said quick-release lock mechanisms comprises:

a cam rod inserted through said through hole of said wheel shaft;

a cam roller fixed on said cam rod and having a greatest radius area contacting said corresponding end surface of said hub; and means for biasing said cam rod to rotate in a direction so that said greatest radius of said cam roller can contact said corresponding end surface of said hub.

14. A foldable pedicab as claimed in claim 13, wherein means for attaching said main wheel to said foldable assembly when said pedicab is folded includes a circular rod extending downwardly from a bottom surface of each of said footrests, said circular rod being shaped in form of said wheel shaft, whereby, when said pedicab is folded, said footrests are rotated to its vertical position permitting said circular rods to extend transversely outwardly in a coaxial arrangement for locking said main wheels on said circular rods by said quick-release lock mechanisms.

* * * * *